(12) United States Patent
Wang

(10) Patent No.: US 8,849,838 B2
(45) Date of Patent: Sep. 30, 2014

(54) BLOOM FILTER FOR STORING FILE ACCESS HISTORY

(75) Inventor: Cheuksan Edward Wang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1694 days.

(21) Appl. No.: 12/014,718

(22) Filed: Jan. 15, 2008

(65) Prior Publication Data

US 2009/0182726 A1    Jul. 16, 2009

(51) Int. Cl.
*G06F 17/30* (2006.01)

(52) U.S. Cl.
CPC ............................ *G06F 17/30979* (2013.01)
USPC .......................................... 707/754; 707/721

(58) Field of Classification Search
USPC ......... 707/672, 673, 694, 698, 700, 701, 705, 707/706, 709, 721, 723, 732, 754; 709/219, 709/224
See application file for complete search history.

(56) References Cited

U.S. PATENT DOCUMENTS

| | | | |
|---|---|---|---|
| 5,878,223 A | 3/1999 | Becker et al. ............ 395/200.53 |
| 5,978,791 A | 11/1999 | Farber et al. ...................... 707/2 |
| 5,978,847 A | 11/1999 | Kisor et al. .................... 709/227 |
| 6,003,030 A | 12/1999 | Kenner et al. ................... 707/10 |
| 6,023,726 A | 2/2000 | Saksena ......................... 709/219 |
| 6,029,175 A | 2/2000 | Chow et al. .................... 707/104 |
| 6,067,565 A | 5/2000 | Horvitz .......................... 709/218 |
| 6,085,193 A | 7/2000 | Malkin et al. ................... 707/10 |
| 6,085,226 A | 7/2000 | Horvitz .......................... 709/203 |
| 6,098,064 A | 8/2000 | Pirolli et al. ....................... 707/2 |
| 6,108,703 A | 8/2000 | Leighton et al. .............. 709/226 |
| 6,134,583 A | 10/2000 | Herriot .......................... 709/217 |
| 6,182,122 B1 | 1/2001 | Berstis .......................... 709/217 |
| 6,182,133 B1 | 1/2001 | Horvitz .......................... 709/223 |
| 6,195,622 B1 | 2/2001 | Altschuler et al. ................ 703/2 |
| 6,405,252 B1 | 6/2002 | Gupta et al. ................... 709/224 |
| 6,421,726 B1 | 7/2002 | Kenner et al. ................. 709/225 |
| 6,484,143 B1 | 11/2002 | Swildens et al. ................. 705/1 |

(Continued)

FOREIGN PATENT DOCUMENTS

| | | |
|---|---|---|
| EP | 1182589 A2 | 2/2002 |
| GB | 2317723 A | 4/1998 |
| WO | WO 02/100117 A1 | 12/2002 |
| WO | WO 2005/006129 | 1/2005 |

OTHER PUBLICATIONS

Bestavros, A., et al., "Server-initiated Document Dissemination for the WWW," *IEEE Data Engineering Bulletin*, 19(3):3-11, Sep. 1996, pp. 1-8.

(Continued)

*Primary Examiner* — Cam-Linh Nguyen
(74) *Attorney, Agent, or Firm* — Morgan, Lewis & Bockius LLP

(57) ABSTRACT

A method of producing a search query result that incorporates information about previously accessed search results includes retrieving a list of results responsive to a search request from a user at a first client. A Bloom filter is applied to the results in the list of results to identify one or more first results, if any, in the list of results that the user has previously accessed. A result list is generated. The result list includes at least a portion of the list of results, based at least in part on the identified one or more first results. The result list is sent to the first client.

23 Claims, 9 Drawing Sheets

(56) References Cited

U.S. PATENT DOCUMENTS

| | | | | |
|---|---|---|---|---|
| 6,502,125 | B1 | 12/2002 | Kenner et al. | 709/203 |
| 6,505,196 | B2* | 1/2003 | Drucker et al. | 707/751 |
| 6,578,113 | B2 | 6/2003 | Krishnamurthy et al. | 711/141 |
| 6,581,090 | B1 | 6/2003 | Lindbo et al. | 709/217 |
| 6,584,498 | B2 | 6/2003 | Nguyen | 709/219 |
| 6,625,643 | B1 | 9/2003 | Colby et al. | 709/217 |
| 6,631,451 | B2 | 10/2003 | Glance et al. | 711/158 |
| 6,665,726 | B1 | 12/2003 | Leighton et al. | 709/231 |
| 6,742,033 | B1 | 5/2004 | Smith et al. | 709/224 |
| 6,766,422 | B2 | 7/2004 | Beyda | 711/137 |
| 6,804,667 | B1* | 10/2004 | Martin | 707/754 |
| 6,883,135 | B1 | 4/2005 | Obata et al. | 715/500 |
| 6,912,591 | B2 | 6/2005 | Lash | 709/246 |
| 7,130,890 | B1 | 10/2006 | Kumar et al. | 709/218 |
| 7,565,425 | B2* | 7/2009 | Van Vleet et al. | 709/224 |
| 7,668,949 | B1* | 2/2010 | Allan | 709/223 |
| 2002/0156864 | A1 | 10/2002 | Kniest | 709/217 |
| 2002/0198961 | A1 | 12/2002 | Krishnamurthy et al. | 709/217 |
| 2003/0046343 | A1 | 3/2003 | Krishnamurthy et al. | 709/203 |
| 2004/0064577 | A1 | 4/2004 | Dahlin et al. | 709/235 |
| 2004/0205149 | A1 | 10/2004 | Dillon et al. | 709/217 |
| 2005/0021758 | A1* | 1/2005 | White | 709/226 |
| 2005/0033803 | A1 | 2/2005 | Vleet et al. | 709/203 |
| 2006/0294311 | A1 | 12/2006 | Fu et al. | 711/118 |
| 2007/0255823 | A1* | 11/2007 | Astley et al. | 709/224 |
| 2008/0071904 | A1* | 3/2008 | Schuba et al. | 709/224 |
| 2008/0155229 | A1* | 6/2008 | Beyer et al. | 711/216 |
| 2008/0313132 | A1* | 12/2008 | Hao et al. | 707/2 |

OTHER PUBLICATIONS

Bruck, J., et al., "Weighted Bloom Filter," Information Theory, 2006 IEEE, Jul. 1, 2006 pp. 2304-2308.

Cao, P., et al., "A Study of Integrated Prefetching and Caching Strategies," *Proceeding of 1995 ACM SIGMETRICS*, Jun. 1995, pp. 171-182.

Curewitz, K.M., et al., "Practical Prefetching via Data Compression," *Proceedings of the 1993 ACM Conf. on Management of Data (SIGMOD)*, Washington DC, May 1993, pp. 257-266.

Fan, L., et al., "Web Prefetching Between Low-Bandwidth Clients and Proxies: Potential and Performance," *Proceedings of the ACM SIGMET-RICS Conf.*, May 1999, pp. 178-187.

Gong, X., et al., "Bloom filter-based XML Packets Filtering for Millions of Path Queries," Proceedings of the 21st International Conference on Data Engineering (ICDE 2005), 12 pages.

Griffioen, J., et al., "Reducing File System Latency Using a Predictive Approach," *Proceedings of 1994 USENIX Summer Conf.*, Jun. 1994, pp. 197-207.

Gwertzman, J.S., et al., "The Case for Geographical Push-Caching," *Proceedings on the 1995 Workshop on Hot Operating Systems*, 1995, 5 pages.

Kimbrel, T., et al., "Integrated Parallel Prefetching and Caching," *Proceedings of the 1996 ACM SIGMETRICS Int'l Conf. on Measurement and Modeling of Computer Systems*, 1996, pp. 262-263.

Kroeger, T.M., et al., Digital's Web Proxy Traces, ftp://ftp.digital.com/pub/DEC/traces/proxy/webtraces.html, Dec. 1996.

Markatos, E.P., et al., "A Top-10 Approach to Prefetching on the Web," *Technical Report No. 173, ICS-FORTH*, Heraklion, Crete, Greece, Aug. 1996, pp. 1-15.

Padmanabhan, V.N., et al., "Using Predictive Prefetching to Improve World Wide Web Latency," ACM SIGCOMM Computer Communication Review, Jul. 1996, 15 pages.

Palmer, M., et al., "Fido: A Cache That Learns to Fetch," *Proceedings of the 17th Int'l Conf on Very Large Data Bases*, Barcelona, Spain, Sep. 1999, pp. 255-264.

Patterson, R.H., et al., "Informed Prefetching and Caching," *Proceedings of the 15th ACM Symposium on Operating Systems Principles*, Dec. 1995, pp. 79-95.

Schilit, B.N., et al., "TeleWeb: Loosely Connected Access to the World Wide Web," 5th Int'l World Wide Web Conference, Paris, France, May 6-10, 1996.

Tait, C.D., et al., "Detection and Exploitation of File Working Sets," *Proceedings of the 11th Int'l Conf. on Distributed Computing Systems*, May 1991, pp. 1-19.

Vitter, J.S., et al., "Optimal Prefetching via Data Compression," *Journal of the ACM*, vol. 43, Sep. 1996, pp. 771-793.

Williams, S., et al., "Removal Policies in Network Caches for World-Wide Web Documents," *Proceedings of ACM SIGCOMM '96 Conf.*, Aug. 1996, pp. 293-305.

International Search Report and Written Opinion for International Application No. PCT/US2008/054167, mailed Jul. 2, 2008.

International Search Report and Written Opinion for International Application No. PCT/US2008/088047, mailed Feb. 23, 2009.

Office Action dated Feb. 3, 2009 for related U.S. Appl. No. 11/675,601.

Office Action dated Feb. 25, 2009 for related U.S. Appl. No. 11/418,648.

Office Action dated Mar. 5, 2009, for related U.S. Appl. No. 11/418,649.

Google Inc., International Preliminary Report on Patentability, PCT/US2008/088047, Jul. 20, 2010, 5 pages.

Google Inc., International Search Report and Written Opinion, PCT/US2008/088047, Feb. 23, 2009, 7 pages.

Google Inc., Office Action, CA 2,711,779, Nov. 14, 2013, 3 pgs.

Google Inc., Office Action, CA 2,711,779, Oct. 29, 2012, 3 pgs.

* cited by examiner

US 8,849,838 B2

BLOOM FILTER FOR STORING FILE ACCESS HISTORY

FIELD

The present specification relates generally to storing file access history, and more specifically to storing file access history for multiple users using a shared Bloom filter.

SUMMARY OF DISCLOSED EMBODIMENTS

A method of producing a search query result that incorporates information about previously accessed search results includes retrieving a list of results responsive to a search request from a user at a first client. A Bloom filter is applied to the results in the list of results to identify one or more first results, if any, in the list of results that the user has previously accessed. A result list is generated. The result list includes at least a portion of the list of results, based at least in part on the identified one or more first results. The result list is sent to the first client.

In some embodiments, the results in the list of results are content items in a database. In some embodiments, the Bloom filter stores information with respect to content items accessed by respective users of a plurality of users.

BRIEF DESCRIPTION OF THE DRAWINGS

For a better understanding of the embodiments, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
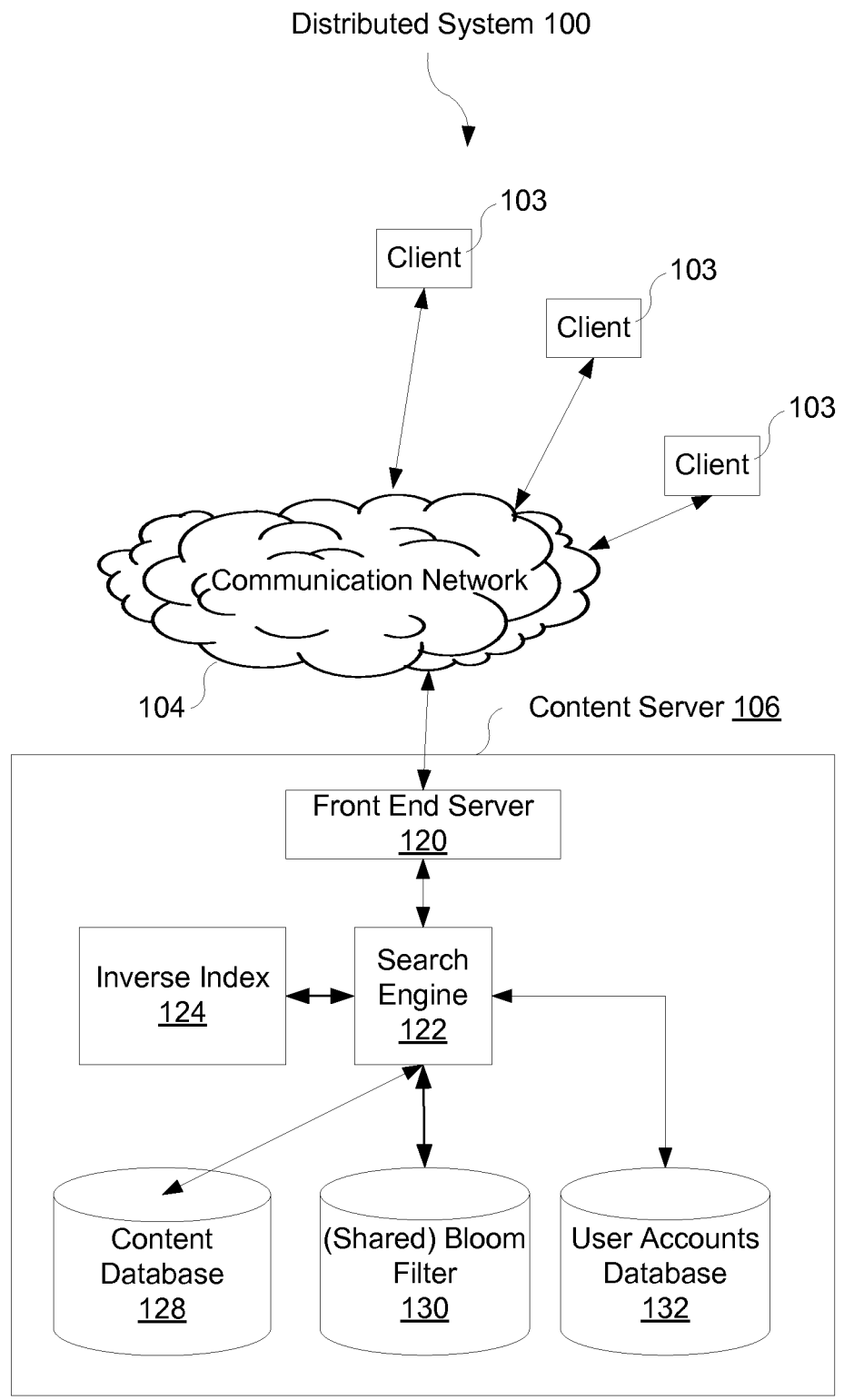
FIG. 1 is a block diagram illustrating a distributed system in which a content server utilizes a shared Bloom filter to store access history information for multiple users.

Keeping a record of the items in a database that a user accesses can be useful or important in a number of contexts. For example, this information can be used to inform a user of the items in a database that have already been accessed by the user, and the user can use this information to avoid wasting time accessing an item a second time. Alternatively, a record of previously accessed items is useful to a user who needs to find an item previously accessed in a database without accessing every item that matches a user query to make such a determination.

As the size of the database increases, the number of items a user has accessed may also grow quite large. Thus, a record of items that a user has previously accessed may require an ever increasing amount of memory or storage to hold such the record. Moreover, as the number of users that access a database grows, the total amount of memory required to maintain a file or a log for every user increases. Therefore, large databases having many users may require a large amount of memory to maintain a record of the items accessed by each user. Furthermore, as the size of the access records increases, the amount of processing power needed to maintain the records and to create reports to inform a user of previously accessed items may increase commensurately. Thus, for some systems, the performance loss or costs associated with maintaining and searching user access history records may outweigh the usefulness of maintaining user access history records.

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that the embodiments may be practiced without these specific details. In other instances, well-known methods, procedures, components, and circuits have not been described in detail so as not to unnecessarily obscure aspects of the embodiments.

The following short description of Bloom filters is provided for readers who are not familiar with this well known computer science mechanism. A Bloom filter is a space-efficient probabilistic data structure used for detecting whether an object is a member of a set. In embodiments of the present invention discussed below, each "object" represents an event in which a user has accessed a search result or content item (e.g., a video file). The Bloom filter includes a plurality of hash functions (e.g., $H_1$, $H_2$, $H_3$, and $H_4$) and an array, which can be considered to be an M-bit vector. For each object "a" in the set, the corresponding bits at positions (e.g., $P_1=H_1(a)$, $P_2=H_2(a)$, $P_3=H_3(a)$, and $P_4=H_4(a)$) of the vector, which are determined by the respective hash functions $H_1$, $H_2$, $H_3$, and $H_4$, are set to 1.

To check whether an object "b" is a member of the set, the hash functions are applied to the object "b" to determine a set of bit positions (e.g., $H_1(b)$, $H_2(b)$, $H_3(b)$, and $H_4(b)$). If any of these bit positions stores a value of 0, the object "b" is not in the set. Otherwise (i.e., if the values stored in all of the determined positions are equal to 1), it is assumed that the object "b" is in the set although there is a certain probability that the object "b" is not actually in the set, also known as a "false positive." The "false positive" probability can be reduced by increasing the size M of the bit vector and the number of hash functions. On the other hand, the "false positive" probability increases as more objects are added to the set.

To summarize, a Bloom filter contains two or more hash functions and a corresponding Bloom filter array. The Bloom filter array contains a plurality of locations. When the hash functions are applied to an object, e.g., a value representing a search result obtained for a particular user, the hash functions output a set of distinct location values. To determine if the search result has previously been accessed by a user, these locations in the Bloom filter array are read, and if all of these locations store a predefined value (e.g., 1), it is determined that the search result has been previously accessed by the user. To store new information in the Bloom filter, representing a search result obtained or viewed by a user, the filter array locations for the object are computed using the Bloom filter's hash functions, and then the predefined value (e.g., 1) is written to all of those locations. The characteristics of a Bloom filter, especially it's rate of returning false positive results, are based on the size of the Bloom filter array, the number of hash functions used by the Bloom filter, and the number of objects or items that have been stored in the Bloom filter.

In embodiments of the present invention discussed below, a shared Bloom filter is used to store access history information for each user in a group of users. The access history stored by the Bloom filter is used to determine if a list of results generated in response to a search request includes items previously accessed by the user who initiated the search request.

FIG. 1 illustrates a distributed system 100 including an embodiment of a Bloom filter for storing file access history information. Embodiments of a distributed system 100 may include multiple data centers, each housing one or more content servers 106. The data centers may optionally be widely dispersed from one another, such as across the continental United States. A search request from one of the clients 103 may be routed to an appropriate content server 106 as part of the Domain Name System (DNS), based on current load, geographic locality and the operational status of the data centers.

An embodiment as illustrated in FIG. 1 includes a plurality of clients 103 coupled to a content server 106 through a communication network 104. A respective client 103 may be any device (e.g., a computer, personal digital assistant, cell phone, kiosk terminal, etc.) that provides access to a content database 128 in the content server 106. Communication network 104 may be a local area network (LAN), wide area network (WAN), intranet, and/or the Internet, also referred to as the World Wide Web (WWW), or any combination of such networks.

In some embodiments, content server 106 includes a front end server 120, a search engine 122, an inverse index 124, a content database 128, a Bloom filter 130, and a user accounts database 132. Front end server 120 may be a hardware or software module that interfaces with communication network 104 and is coupled to search engine 122. Search engine 122 is used to search an inverse index 124 for items, such as multimedia files located in one or more content databases 128. Multimedia files may be audio files, video files, or files having any combination of audio, video, and other content (e.g., text). Note that the search engine 122 may be used to search one or more content databases 128. In some embodiments, the one or more content databases 128 may include databases local to the content server 106 as well as databases located remotely with respect to the content server 106.

While FIG. 1 shows a single search engine 122, inverse index 124, content database 128, Bloom filter 130, and so on, one or more of these content server components may be distributed over two or more servers, or partitioned into multiple components, to facilitate efficient processing and to manage storage of all the information data in the content server 106. The number of servers and the number of database and/or index partitions used to implement the content server 106 is determined in accordance with the amount of data stored, as well as both average and peak processing demands on the content server 106.

In some embodiments, front end server 120 is a web server that receives a search query request from a client 103 and delivers a result list in the form of one or more web pages. The front end server may communicate with a respective client using hypertext transfer protocol (HTTP), TCP/IP, or other protocols. Alternatively, the front end server 120 may be an intranet server. In some embodiments, front end server 120 controls the search process, including prompting search engine 122 to search the inverse index 124, and analyzing and formatting a result list received from search engine 122.

In some of embodiments, search engine 122 includes a cache (not shown) that stores search results from previously executed search queries. The efficiency of performing searches may be improved and the cost reduced by maintaining a cache of such search results. In some embodiments, snippets of the content items corresponding to at least some of the search results are stored in the cache along with the cached search results.

In response to a search request (also called a search query), search engine 122 produces an ordered list of results that satisfy (or that are consistent with) the search request. To produce the list of results, the search engine 122 may access the inverse index 124 to identify items that satisfy the search request. The inverse index 124 and/or the search engine 122 may determine one or more scores for each of the identified items, which are then used by the search engine 122 to order the identified items so as to produce the ordered list of results.

The search engine 122 may optionally request snippets for all or a subset of the items in the ordered list of results from the content database 128. For example, search engine 122 may request snippets for the first fifteen or so of items in the ordered list of results. In some embodiments, content database 128 constructs snippets based on the search request, and returns the snippets to search engine 122. The resulting snippets (or a subset of the snippets) are incorporated into the ordered list of results.

Search engine 122 also filters the list of results produced in response to a search request with a Bloom filter 130. Bloom filter 130 determines if results list items have been previously accessed by the user who initiated the search request. Search engine 122 may send result list items to Bloom filter 130 before snippets are requested, in parallel with a request for snippets, or after snippets are requested. Search engine 122 then returns a result list of items filtered by Bloom filter 130 to front end server 120.

To filter a respective item in a search result list with Bloom filter 130, the search engine sends a content identifier associated with the result list item to the Bloom filter 130. The content identifier may be an identifier used internally (e.g., in the inverse index 124) by the content server 106 to uniquely identify a content item, or it may be a value such as a URL or other address value that identifies the location of a content item. More generally, a content identifier may be any type of identifier that uniquely identifies a result list item. In some embodiments, along with the content identifier, the search engine 122 also provides a user identifier (user ID) associated with the user who issued the search request being processed. The user ID may be provided by or with the search request. In some embodiments, the user ID may be found in or retrieved from a user accounts database 132 if the user has previously utilized the content server.

As mentioned above, in some embodiments the information sent by the search engine 122 to the Bloom filter to filter a search result (also called a search result item) is a user identifier and a content identifier (content ID). The Bloom filter 130 uses this information to produce a result that indicates whether the user associated with the user identifier has previously accessed the search result item associated with the content identifier. In some embodiments, the user identifier and content identifier are concatenated, and the resulting value is processed by each of the hash functions of the Bloom filter 130 to determine if the user who sent the search request has previously accessed the search result item.

In some embodiments, search engine 122 sends a search result list, or plurality of result results, along with the user identifier of the requesting user, to Bloom filter 130 for filtering.

Figure 2:
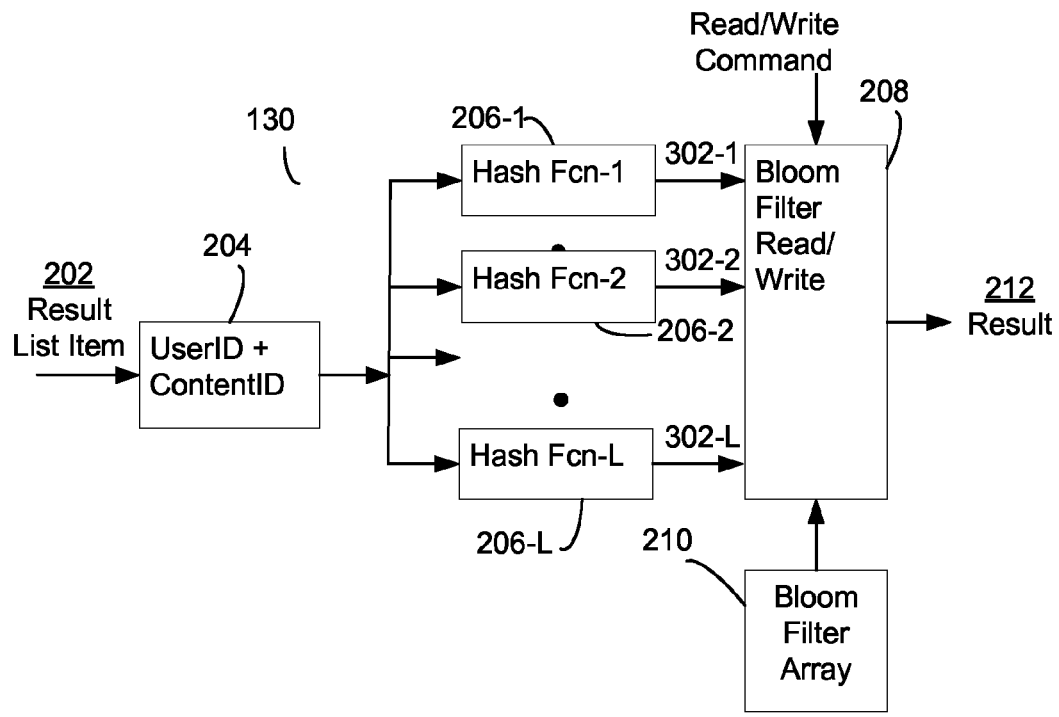
FIG. 2 is a block diagram illustrating a function or process for filtering a search result using a Bloom filter in accordance with some embodiments.
Figure 3:
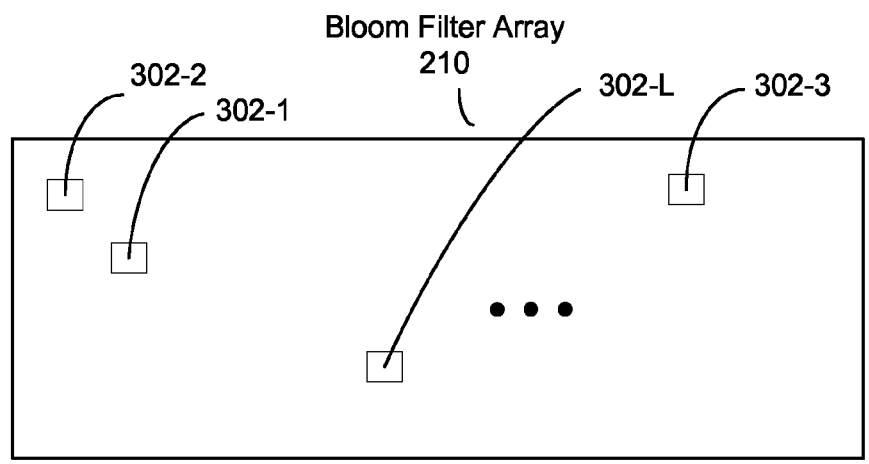
FIG. 3 illustrates a Bloom filter array for storing access history information in accordance with some embodiments.

FIG. 2 is a block diagram illustrating an embodiment of a Bloom filter 130. Bloom filter 130 has two or more hash functions 206, a Bloom filter read/write module 208, and a Bloom filter array 210. FIG. 3 shows that Bloom filter array 210 has a plurality of locations 302, each of which corresponds to a position computed by one of the hash functions 206 of the Bloom filter. Because the content of the Bloom filter array 210 may need to be updated and accessed at high rates (e.g., thousands of times per minute), it will typically be implemented in random access memory (RAM). An empty Bloom filter has all of its bits set to zero.

To filter a search result using Bloom filter 130, a read command is provided to the Bloom filter, and a corresponding value (e.g., a user identifier) is concatenated with a content identifier, as illustrated by block 204. Hash functions 206 produce a set of distinct location values 302 for each respective result list item 202 to which the hash functions 206 are applied. For a respective result list item 202, the Bloom filter array locations identified by the outputs from hash functions 206 are read by Bloom filter read/write module 208, to determine if the result list item has been previously accessed by the user. For example, if all the identified Bloom filter array locations store a predefined value (e.g., 1), then the result 212 produced by the Bloom filter (e.g., 1) indicates that the result list item was previously accessed by the user. If any (i.e., one or more) of the identified Bloom filter array locations store the opposite value (e.g., 0), then the result 212 (e.g., 0) indicates that the result list item was not previously accessed by the user.

In some embodiments, the range of the output from each of the hash functions 206 extends to every location of Bloom filter array 210. Thus, the Bloom filter array position produced by each hash function 206 can be located anywhere within the Bloom filter array 210.

For a result list item 202 input to hash functions 206, the hash functions 206 produce a set of distinct location values 302 unique (or more accurately, highly likely to be unique) for that given result list item 202. In some embodiments, a location value corresponds to a one bit field within the Bloom filter array 210. To determine if a result has been previously accessed by the user for whom the result list was generated, Bloom filter read/write module 208 reads the values of a Bloom filter array 210 at the set of distinct location values 302 received from hash functions 206. In some embodiments, if the data bits stored in the Bloom filter array at the set of distinct location values 302 generated by hash functions 206 are all equal to one, result list item 202 has been previously accessed by the user that initiated the search. However, if any of data bits read from the location values 302 (produced by hash functions 206) are not equal to one (i.e., one or more of the data bits read is not equal to 1), result list item 202 has not been previously access by the user that initiated the search.

As noted above, the Bloom filter 130 produces a result 212 that indicates whether a result list item 202 has been previously accessed by a particular user. In some embodiments, result 212 is equal to 1 if the output of the Bloom filter 130 indicates that the result list item 202 has been previously accessed by the user, and otherwise the result 212 is equal to 0 (indicating that the result list item 202 has not been previously accessed by the user).

Bloom filter 130 also is updated once a user accesses an item. For this case, a write command and a result list item 202 are provided to the Bloom filter. The result list item 202 may be a content identifier or alternatively a content identifier concatenated with a user identifier, as discussed above. Result list item 202 applied to hash functions 206, which produce a set of distinct location values 302 for that result, as described above. Bloom filter read/write module 208 writes a predefined value (e.g., 1) in each of the locations of the Bloom filter array 210 specified by location values 302. In some embodiments, no result 212 is produced when data is written into the Bloom filter array 210. Alternately, a predefined value (e.g., 1) may be produced at result 212, indicative of the values written into the Bloom filter array 210.

Bloom filter 130 provides a space efficient solution for storing access history of multiple users. A Bloom filter 130 also provides a computationally efficient and fast way to determine if an item has been previously accessed by a user, because only a few locations in the Bloom filter array 210 need to be accessed to make the determination.

Bloom filters sometimes produce a false positive result, but never produce false negative results. Thus, Bloom filter 103 may incorrectly indicate that a result list item 202 has been previously accessed by a user, but a negative report by the Bloom filter is always correct. In some embodiments, Bloom filter 130 may have a false positive rate of around 2% or less. In other embodiments, Bloom filter 130 is designed to have a false positive rate of 1% or less. To adjust the false positive rate of a Bloom filter 130 to an acceptable rate, the number of hash functions (k) used and the number of bits (m) in the Bloom filter array 130 may be adjusted for a given (i.e., maximum) number of items (n) stored in Bloom filter 130. The false positive rate of a Bloom filter 130 is approximately equal to $(1-e^{-kn/m})^k$. Therefore, one skilled in the art could design a Bloom filter 130 of any size having a false positive rate that meets the need of a particular application. For some embodiments, m is equal to 128 Gigabits (16 Gigabytes) and k is equal to or greater than five. Some embodiments using a 16 Gigabyte Bloom filter array 210 includes using six to eight hash functions 206. An exemplary embodiment includes a Bloom filter 130 having a 16 Gigabyte Bloom filter array 210 using seven hash functions 206 to obtain a false positive rate of that does not exceed one percent so long as the number of items stored in the Bloom filter array remains less than about 12 billion ($12 \times 10^9$).

Figure 7:
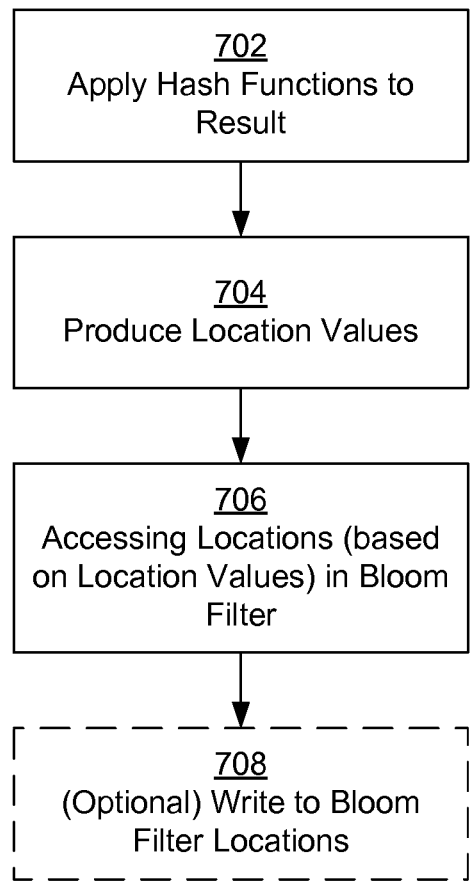
FIG. 7 is a flow diagram illustrating a process for storing access history information in a Bloom filter, in accordance with some embodiments.

FIG. 7 illustrates an embodiment of a process of using a Bloom filter 130. The plurality of hash functions 206 for the Bloom filter are applied to a value (e.g., the above discussed concatenation or other combination of a content identifier and user identifier) representing a result from a result list (702), as discussed above. The hash functions 206 produce location values (704) associated with a Bloom filter array 210. The identified locations in the Bloom filter array 210 are accessed to determine if the result has been previously accessed by the user who requested the search (706). In some embodiments, a result is determined to have been previously accessed if all locations of a Bloom filter array 210 that correspond to the location values generated by hash functions 206 contain a value equal to one. Optionally, the process may write to locations within a Bloom filter array 210 responsive to a user accessing a result. Similar to that discussed above, the hash function 206 of the Bloom filter are applied to a value representing a content item accessed by a user. In some embodiments, the hash functions 206 produce location values for that result and these locations within Bloom filter array 210 are updated to indicate the content item (which may correspond to a result in the aforementioned result list) has been accessed.

Figure 4:
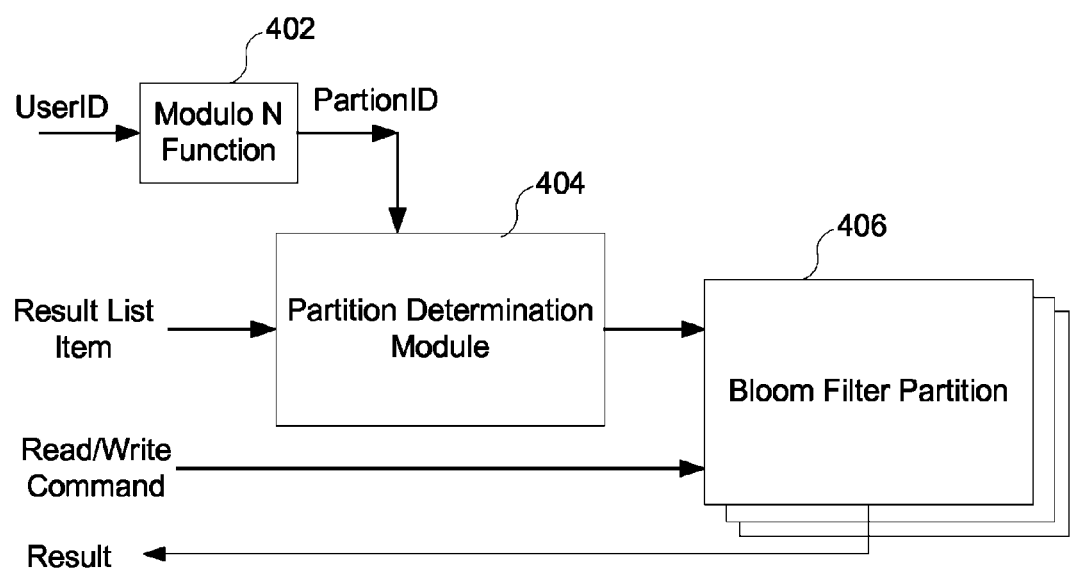
FIG. 4 is a block diagram illustrating an embodiment of a partitioned Bloom filter for storing access history information.

Referring to FIG. 4, in some embodiments, Bloom filter 130 may include a plurality of partitions 406, each of which is used to process the results lists and search result selections of many users (e.g., each partition may be used to handle the results lists and search result selections of thousands of users). Each partition 406 includes a plurality of hash functions 206, a Bloom filter read/write module 208, and a Bloom filter array 210 similar to that of the embodiment shown in FIG. 2. As shown in FIG. 4, in some embodiments a user's user identifier is used to determine which partition of the Bloom filter 130 to use when filtering result lists produced for the user. In this embodiment, the user identifier is processed by a modulo N function 402 to determine the associated Bloom filter partition 406. In some embodiments, the modulo N function 402 is a "modulo 8" function. The output of the modulo N function 402 is a partition identifier that is sent to partition determination module 404. The modulo N function 402 outputs a value between 0 and N−1, which identifies one of N partitions of the Bloom filter 130. Partition determination module 404 uses the partition identifier to send a result list item 202 to the Bloom filter partition 406 associated with the user identifier. The Bloom filter partition 406 returns a result 212, as discussed above. The same modulo N function 202 is also used to determine which Bloom filter partition 406 to update when a respective user accesses a search result.

Figure 10A:
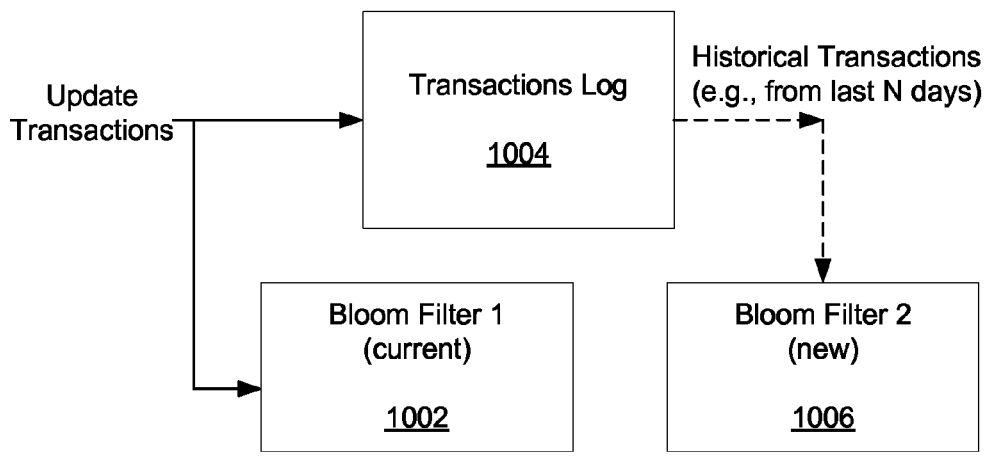
FIGS. 10A and 10B depict a process of replacing a current Bloom filter with a new Bloom filter.
Figure 10B:
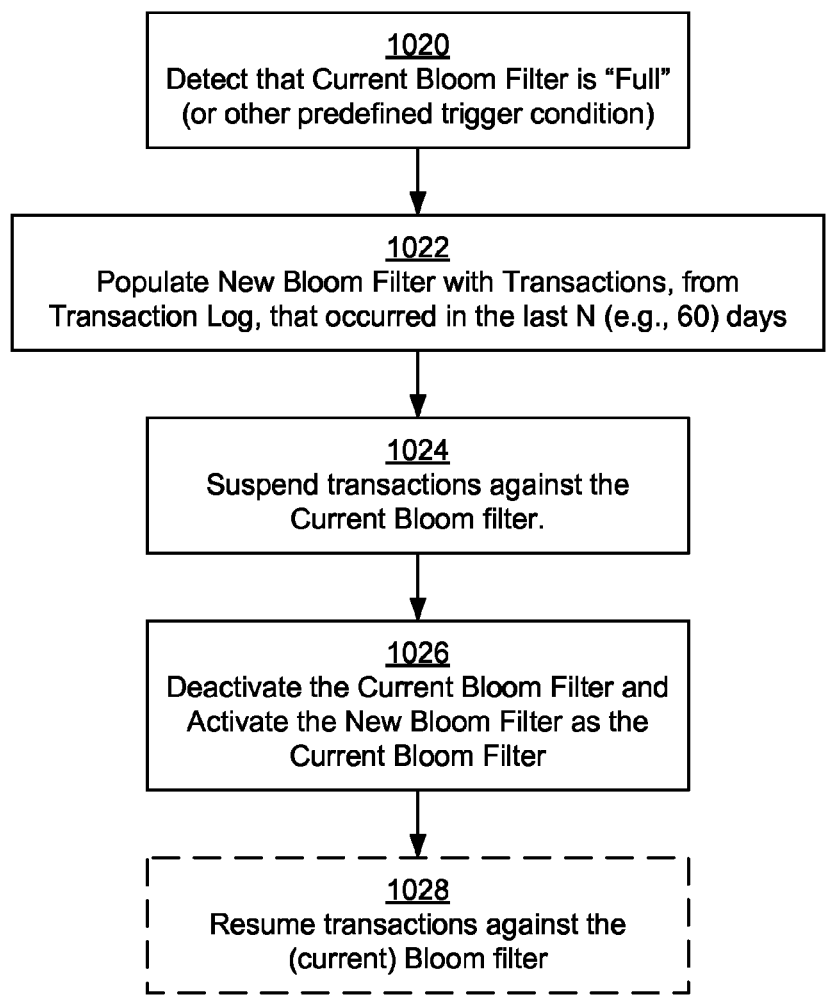

Referring to FIGS. 10A and 10B, in some embodiments, a transactions log 1004 (sometimes called a transactions record) of items accessed by a client 103 is maintained in combination with a Bloom filter 130. For example, the transaction log 1004 may be used to store a record of events that are used to update a Bloom filter 1002. The transaction log 1004 may store information related to each event, such as the time an item was requested, the content identifier (ContentID) of the item requested or accessed, the user identifier (UserID) of the user who requested or access the item, an identifier of the client 103 used to access an item, and any other relevant information. A subset of the information in the transaction log 1004 may be used to initialize another Bloom filter 1006. This is sometimes called "generating a new Bloom filter." Generating a new Bloom filter 130 may become necessary when the number of items stored in a Bloom filter 1002 reaches the maximum number of items that can be stored in the Bloom filter 1002 while maintaining a false positive rate that is below a predefined limit (e.g., 1% or 2%). In the examples above, the number of items stored in the Bloom filter 1002 is the number of content items accessed by all the users associated with the Bloom filter 1002. When the number of items stored in the current Bloom filter 1002 reaches the predefined maximum number, the Bloom filter is sometimes said to be "full." If additional items were to be stored in a full Bloom filter 1002, the false positive error rate will exceed the predefined limit (also called the predefined maximum false positive error rate).

In some embodiments, a new Bloom filter 1006 is generated after the passage of a predefined period of time (e.g., N months, or N days, where N is an appropriate number), after a predefined number of items accessed by users have been stored in the current Bloom filter 1002, or after the predicted false positive rate for the current Bloom filter 1002 exceeds a predefined limit (1020). More generally, a new Bloom filter 1006 is generated when a predefined trigger condition is detected.

The Bloom filter array of the new Bloom filter 1006 is initially filled with zero values, and then the Bloom filter is populated with transactions from a transaction log 1004 (1022). For example, the Bloom filter may be populated with all applicable entries from a predefined period of time (e.g., the last 60 days), or with the last M entries of the transactions log, where M represents a predefined value or a predefined faction of the maximum number of items that can be stored in the Bloom filter while maintaining a false positive rate that is below a predefined limit. In a Bloom filter with an array of 128 Gigabits, and 7 hash functions, and a target or maximum false positive error rate of 1%, an appropriate value of M would be about 12 billion entries. In addition, both read and write transactions against the current Bloom filter 1002 are suspended (1024). The exact timing of when transactions against the current Bloom filter are suspended may depend on the volume or rate of those transactions, the length of time it takes to populate the new Bloom filter with historical entries from the transaction log, and possibly other factors as well. In some embodiments, transactions against the current Bloom filter continue until the new Bloom filter has been populated with historical entries, after which a transition occurs to the new Bloom filter (1024, 1026, 1028). In some embodiments the process of populating the new Bloom filter may be completed after transactions against the current Bloom filter are suspended.

After the completion of the aforementioned operations for generating a new Bloom filter and suspending transactions against the current Bloom filter, the current Bloom filter is deactivated (e.g., disabled) and the new Bloom filter is activated as the current Bloom filter (1026). Then transactions against the "current" Bloom filter are resumed (1028), with the "current" Bloom filter being the new Bloom filter that was initialized with entries from historical transactions.

In some embodiments, Bloom filters 1002 and 1006 comprise the same Bloom filter, with two Bloom filter arrays. In other words, the hash functions and other executable instructions of the two Bloom filters are shared. In some other embodiments, even the Bloom filter arrays of the two Bloom filters 1002 and 1006 are the same, with the Bloom filter array of Bloom filter 1002 being reset or cleared, and then populated with entries from a transaction log to produce the Bloom filter array of the new Bloom filter 1006.

Figure 5:
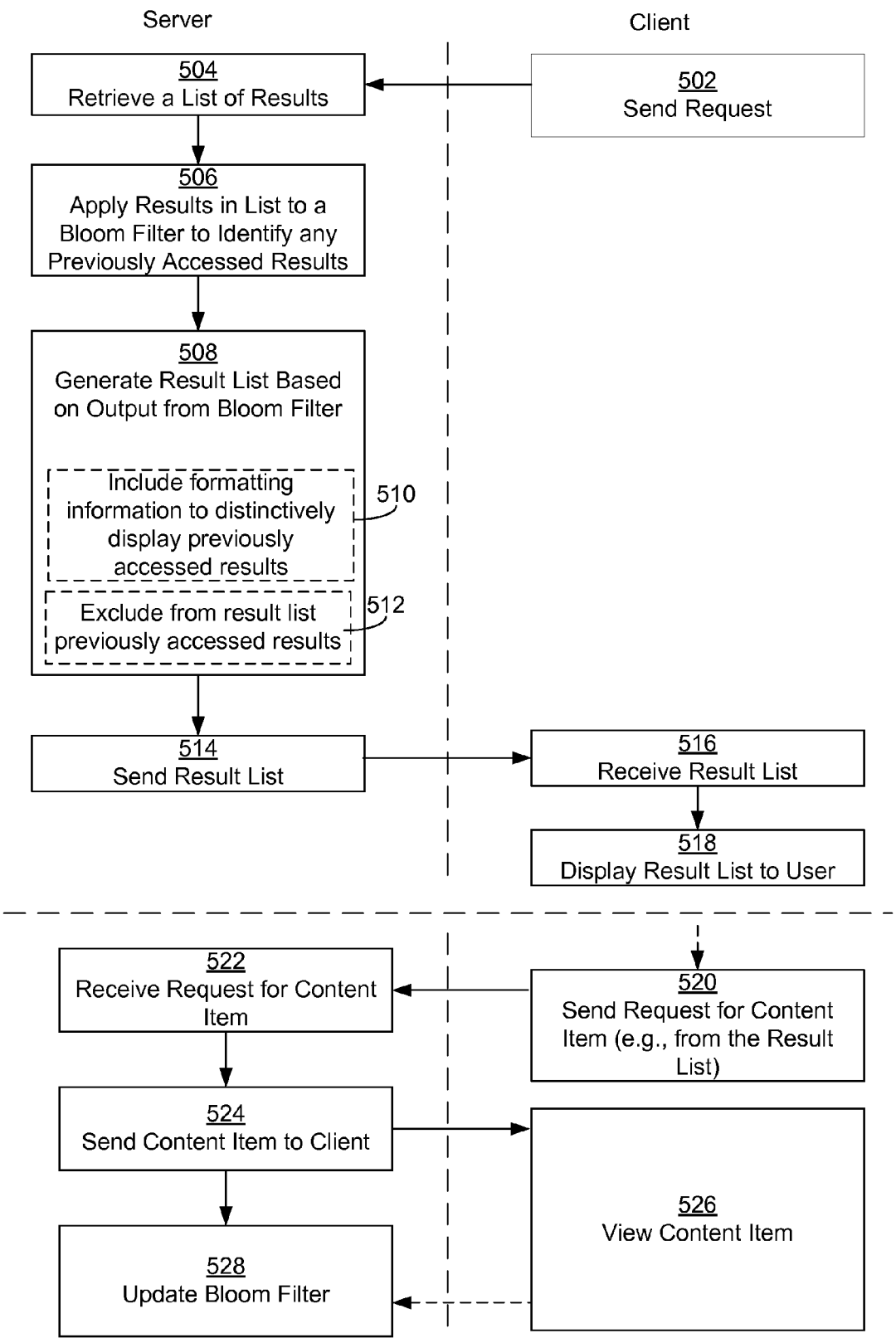
FIG. 5 is a flow diagram illustrating a process to produce a result list that reflects results, if any, previously accessed by the requesting user in accordance with some embodiments.

FIG. 5 illustrates an embodiment of a process for using a Bloom filter to filter a result list produced for a user. The Bloom filter used during this process may be a "community Bloom filter" that stores content access information for a community of users or other plurality of users, as described elsewhere in this document. The process begins when a client 103 sends a query (also called a search request) to a content server 106 (502). As discussed above, the search request may be a search request for items in a content database 128. Content server 106 retrieves a list of results responsive to a search request from client 103 (504). The content server 106 applies a Bloom filter to at least some of the results in the list of results to identify any results that have previously been accessed by the user (506). The "user" here is the user who sent the search request. The user is typically identified by a userID in the search request, or by a userID obtained during session login or the like prior to the receipt of the search query by the server. For each result processed by the Bloom filter, the server receives a yes/no indication as to whether the user has previously accessed the search result. This information may be useful for when producing a final set of search results.

The server may initially apply the Bloom filter to a subset of the result list. For example, in some embodiments the server may apply the Bloom filter to the first twenty or so results in the list, and then return a corresponding portion of the list of results to the user. In addition, the server may apply the Bloom filter to additional results (e.g., the next twenty or so results) in the list of results in response to a request from the client for more results.

A revised result list is generated based on output from the Bloom filter (508), and then the revised result list is sent to the client (514), which receives the result list (516) and displays at least a portion of the result list to the user (518). In some embodiments, only a portion of the revised result list is sent to the client in response to an initial request, and subsequent portions are sent when and if additional requests are received from the client.

In some embodiments, generating the revised result list (508) includes providing formatting information to distinctively display previously accessed results in the result list (510). Results that have been identified as previously accessed results are formatted differently in the revised result list than results that have not been identified as previously accessed by the requesting user. The formatting information in the revised result list is configured to cause previously accessed results to be displayed (518, at the client) distinctively in comparison with other results in the result list. For example, results that have been previously accessed by the user may be highlighted or displayed in a different font color than the other results so as to visually distinguish the previously accessed results from the other results. Alternatively, the formatting information may include an icon, character or a group of characters that is used to indicate that a particular result in the result list has been previously accessed.

In some embodiments, when producing the revised result list (508), results that the Bloom filter indicates have been previously accessed by the user are excluded from the revised result list sent to the client (512).

In some embodiments, the array of a Bloom filter 130 is updated when a user requests a content item (e.g., for viewing at the client). A client 103 may send a request for a content item (520) to a content server. The requested content item may be an item from the result list that was received (516) from content server 106. Content server 106 receives the request for a content item (522). As discussed above, a content item may be a multimedia file. Content server sends the requested content item to client 103 (524), where the content item may be viewed (526). In addition, a Bloom filter is updated (528) to reflect that the requested content item has been accessed by the user, as described above. In some embodiments, the Bloom filter is updated responsive to content server 106 sending the content item to the client. Alternatively, the Bloom filter may be updated responsive to a content item being viewed at the client, as indicated in FIG. 5 by the dashed arrow from block 526 to 528. Thus, the client may send an indication to the content server that a content item is viewed. This indication will then result in the Bloom filter being updated to indicate the content item has been accessed.

Figure 6:
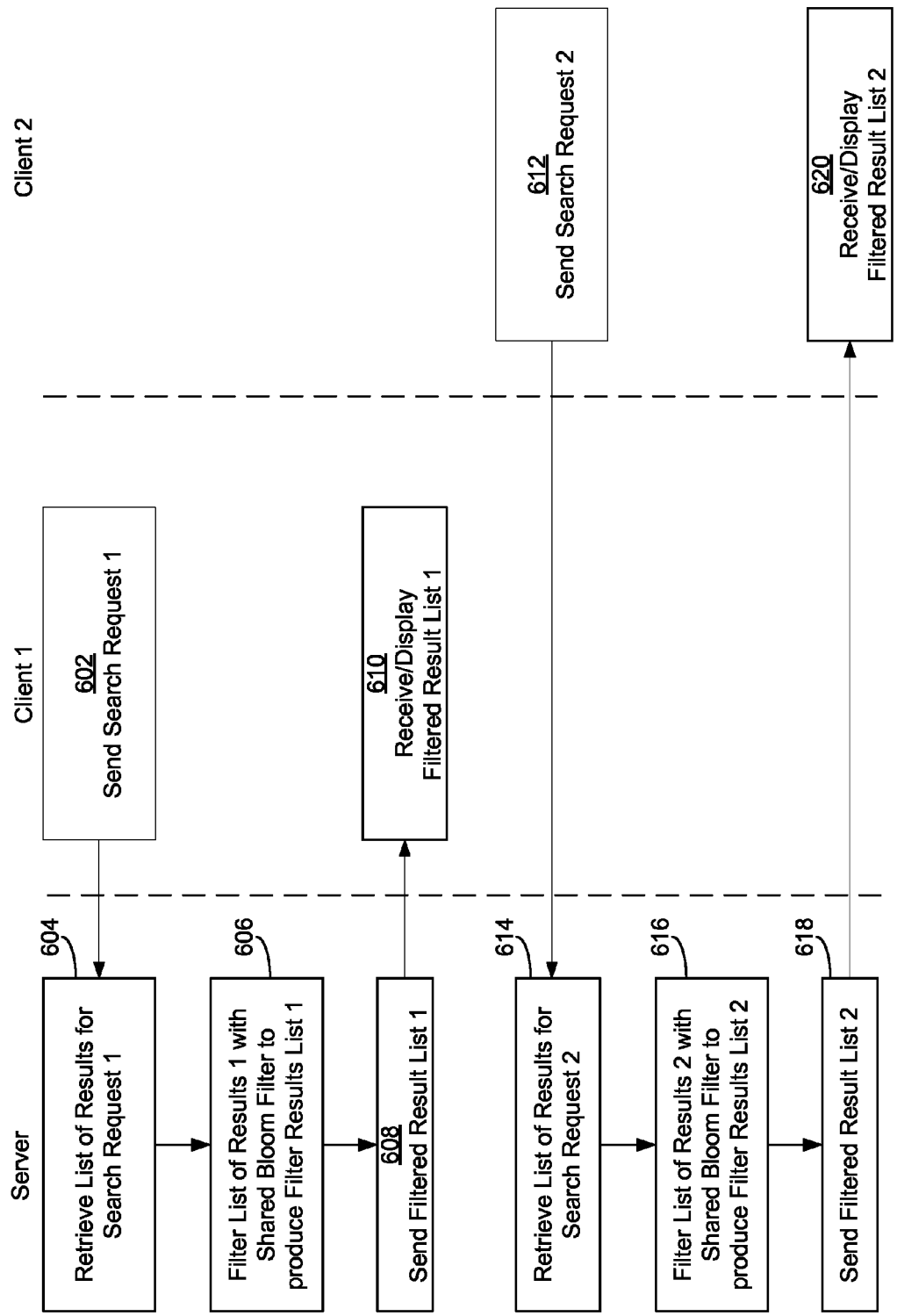
FIG. 6 is a flow diagram illustrating a process to produce filtered results for multiple clients using a shared Bloom filter in accordance with some embodiments.

FIG. 6 illustrates a process to produce filtered results for multiple clients using a shared Bloom filter. A first client (client 1) sends a search request to a server (602). The server retrieves a first list of results responsive to receiving the search request (604). Similarly, a second client (client 2) sends another search request to the server (612), and the server retrieves a second list of results for the second client (614). A Bloom filter shared between multiple clients, including the first client and second client, is used to filter the first and second result lists (606, 616) for the first and second clients, respectively. The server produces a first revised result list (also called a filtered result list) for the first client and a second revised result list (also called a filtered result list) for the second client, using the results produced by the Bloom filter in operations 606 and 616, and using any of the methodologies discussed above to revise the respective result lists. The first revised/filtered result list is sent to the first client (608), which receives the first revised/filtered result list and displays at least a portion of the received list (610). Similarly, the second revised/filtered result list is sent to the second client (618), which receives the second revised/filtered result list and displays at least a portion of the received list (620).

Figure 8:
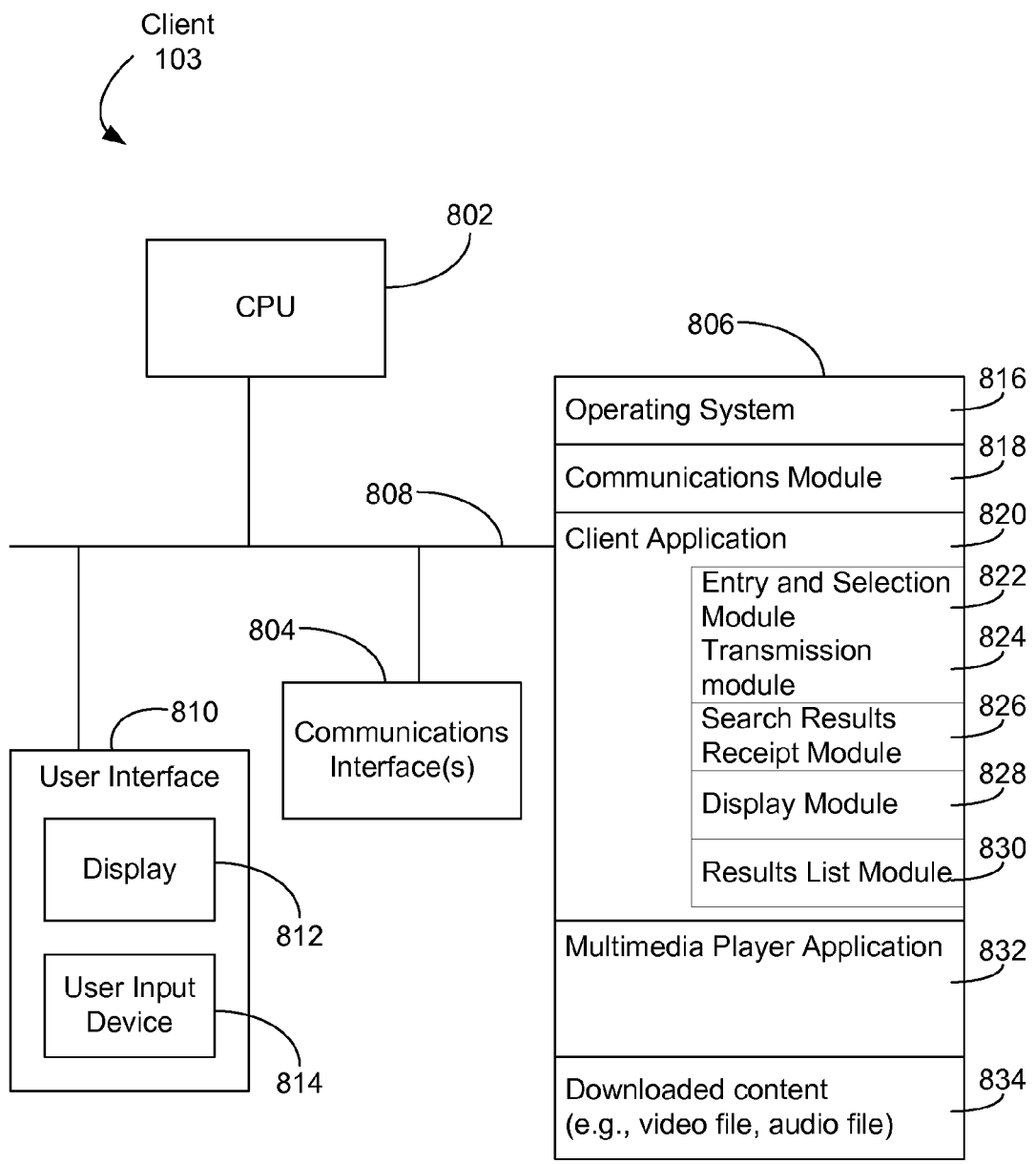
FIG. 8 is a block diagram illustrating an embodiment of a client system.

FIG. 8 is a block diagram of an embodiment of a client 103. The client 103 includes at least one data processor or central processing unit (CPU) 802, one or more optional user interfaces 810, a communications or network interface 804 for communicating with other computers, servers and/or clients, memory 806 and one or more communication buses 808 for coupling these components with one another. The communication buses 808 may include circuitry (sometimes called a chipset) that interconnects and controls communications between system components. User interface 810 may have one or more user input devices 814, such as a keyboard, and/or one or more displays 812.

Memory 806 may include high-speed random access memory, such as dynamic random access memory (DRAM), static random access memory (SRAM), double data rate (DDR) RAM or other random access solid state memory devices, and may include non-volatile memory, such as one or more magnetic disk storage devices, optical disk storage devices, flash memory devices, or other non-volatile solid state storage devices. Memory 806 may optionally include one or more storage devices remotely located from the CPU (s) 802. Memory 806 may store an operating system 816, such as LINUX, UNIX or WINDOWS, that includes procedures (or a set of instructions) for handling basic system services and for performing hardware dependent tasks. Memory 806 may also store communication procedures (or a set of instructions) in a network communication module 818 for communicating with other devices or computers, such as a search engine or content server.

Memory 806 may also include a client application 820 (or a set of instructions) for requesting a search and displaying a result list. Client application 820 may include the following components, or a subset of superset thereof:

an entry and selection monitoring module 822 for monitoring user input,
    a transmission module 824 for sending a search query,
    a search results receipt module 826 for receiving search results,
    a display module 828 for displaying search results as well as web pages, html or XML documents, and/or other documents, and
    a results list module 830 for storing and/or formatting results list received from a server.

Memory 806 may also include a multimedia player application 832 for playing content items retrieved from a server. Downloaded content 834, such as video files and/or audio files, may also be stored in memory 806. For example, downloaded content 834 may include results accessed by a user of client 103. For embodiments where the client 103 is coupled to a local server computer, one or more of the modules and/or applications shown in FIG. 8 as being located in memory 806 may instead be stored in the local server computer.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 806 may include additional modules and/or sub-modules, or fewer modules and/or sub-modules. For example, multimedia player application 832 may be integrated into the client application 820. Memory 806, therefore, may include a subset or a superset of the above identified modules and/or sub-modules.

Figure 9:
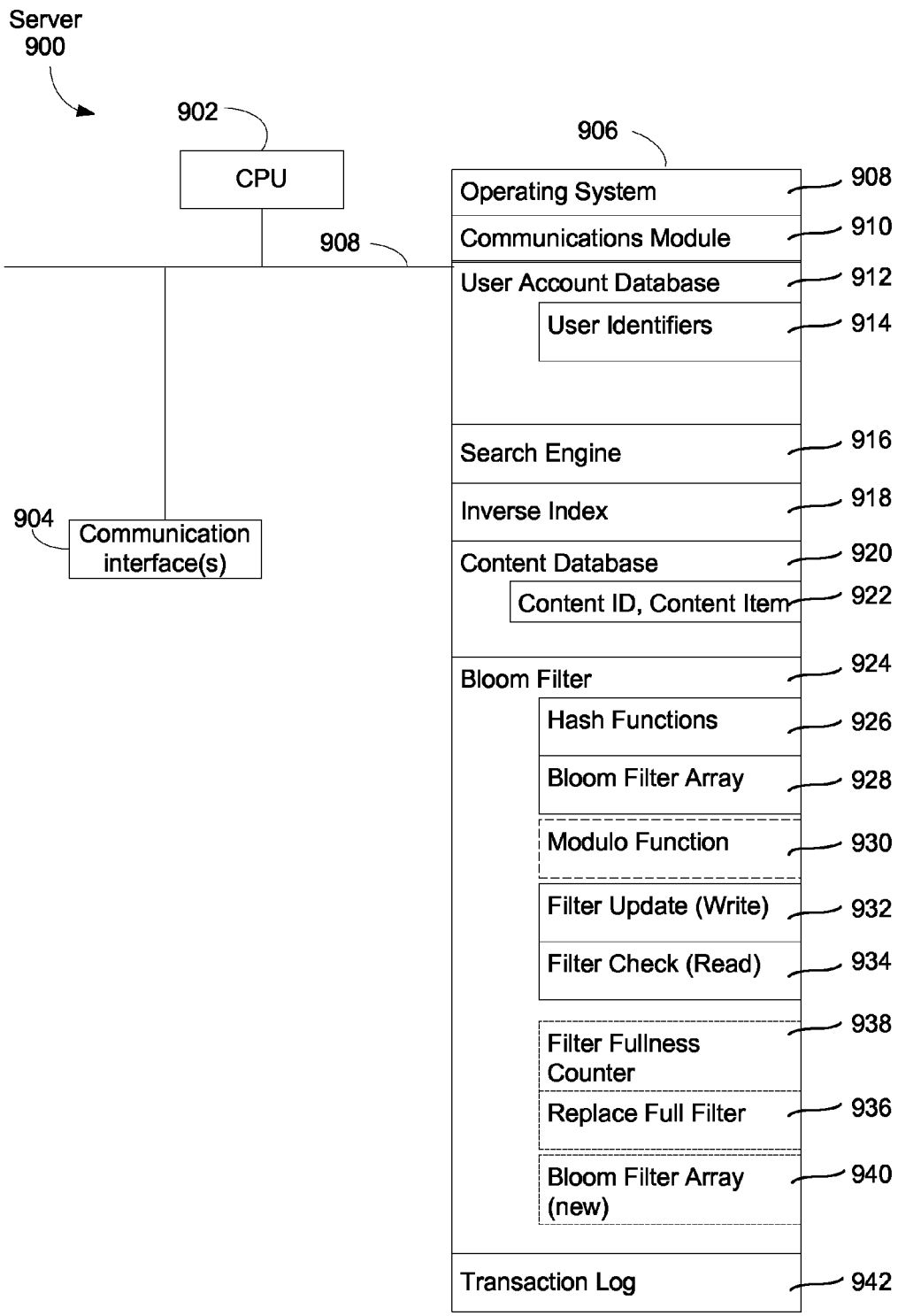
FIG. 9 is a block diagram illustrating an embodiment of a server.

FIG. 9 is a block diagram of an embodiment of a server system 900 that may perform the functions of a content server 106. The server system 900 includes at least one data processor or central processing unit (CPU) 902, a communications or network interface(s) 904 for communicating with other computers, servers and/or clients, memory 906, and one or more communication buses 908 for coupling these components to one another. The communication buses 908 may include circuitry (sometimes called a chipset) that interconnects and controls communications between system components.

Memory 906 may include high-speed random access memory, including solid state or integrated circuit memory devices such as dynamic random access memory and/or flash memory devices, and/or non-volatile memory, such as one or more magnetic disk storage devices, optical storage devices, and/or static memory. Memory 906 may store an operating system 908, such as LINUX, UNIX or WINDOWS, that includes procedures (or a set of instructions) for handling basic system services and for performing hardware dependent tasks. Memory 906 may also store communication procedures (or a set of instructions) in a communications module 910. The communication procedures are used for communicating with clients 103, and with other servers and computers.

Memory 906 may also store the following components, or a subset of superset thereof:
- a user account database 912 that includes the user identifiers 914 of users whose accounts are presented in the user account database 912;
- a search engine 916 for locating information (e.g., content items in a content database 920) that match a search query received from a client;
- an inverse index 918 for mapping words, terms or the like to information items in content database 920;
- content database 920, including content items 922 having corresponding content identifiers (content ID values); and
- a Bloom filter 924, which may correspond in some embodiments to Bloom filter 130 of FIGS. 1, 2 and 3, or to Bloom filter 1002 of FIG. 10.

Bloom filter 924 may include hash functions 926 and a Bloom filter array 928. For embodiments using a partitioned Bloom filter, Bloom filter 924 may include a modulo function 930 for determining which partition a user is associated. Bloom filter 924 may also include a filter update procedure or instructions 932, for storing new entries in the Bloom filter 924; and a filter check procedure or instructions 934, for determining if a specified item has previously been stored in the Bloom filter 924. In addition, Bloom filter 924 may optionally include a filter fullness counter 938, for keeping track of the number of entries that have been stored in the Bloom filter array 928. Bloom filter 924 may optionally include a replace full filter procedure or instructions 936, for populating a "new" Bloom filter array 940 from information in a transaction log 942, and replacing the current Bloom filter array 928 with new Bloom filter array 940 when a trigger condition is determined to have been satisfied (e.g., the Bloom filter array 928 is deemed to have become full, or when the current Bloom filter has been in use for a predetermined period of time).

Although FIG. 9 shows server 900 as a number of discrete items, the figures are intended more as a functional description of the various features which may be present rather than as a structural schematic of the embodiments described herein. In practice, and as recognized by those of ordinary skill in the art, the functions of server 900 may be distributed over a large number of servers or computers, with various groups of the servers or computers performing particular subsets of those functions. Items shown separately in the figures could be combined and some items could be separated. For example, some items shown separately in FIG. 9 could be implemented on single servers and single items could be implemented by one or more servers. The actual number of servers in a system and how features, such as a user account database 912 and/or a search engine 916, are allocated among them will vary from one implementation to another, and may depend in part on the amount of information stored by the system and/or the amount data traffic that the system must handle during peak usage periods as well as during average usage periods.

The foregoing descriptions of specific embodiments are presented for purposes of illustration and description. They are not intended to be exhaustive or to limit the embodiments to the precise forms disclosed. Rather, it should be appreciated that many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method performed on a server system having one or more processors and memory storing one or more programs for execution by the one or more processors to perform the method, comprising:
   retrieving a list of results responsive to a search request from a user at a first client;
   applying a multi-user Bloom filter to results in the list of results to identify one or more first results, if any, in the list of results that the user has previously accessed, wherein applying the multi-user Bloom filter to results in the list of results includes applying a plurality of hash functions to a value, which includes a user identifier of the user and a content identifier associated with a respective result, to produce a plurality of location values, and accessing the plurality of locations in the multi-user Bloom filter;
   generating a result list comprising at least a portion of the list of results, based at least in part on the identified one or more first results; and
   sending the result list to the first client.

2. The method of claim 1, wherein the results in the list of results comprise content items, and the multi-user Bloom filter stores information with respect to content items accessed by respective users of a plurality of users.

3. The method of claim 1, wherein the result list includes information identifying results, if any, in the result list that the user has previously accessed.

4. The method of claim 1, wherein the result list includes formatting information for distinctively displaying results, if any, in the result list that the user has previously accessed.

5. The method of claim 1, wherein the generating excludes from the result list any results that the user has previously accessed.

6. The method of claim 1, wherein the results in the list of results comprise multimedia files.

7. The method of claim 1, further including updating the multi-user Bloom filter in accordance with results in the result list that are accessed by the user.

8. The method of claim 1, wherein applying the multi-user Bloom filter to results in the list of results includes:
   identifying a Bloom filter in a plurality of Bloom filters in accordance with the user, wherein each Bloom filter in the plurality of Bloom filters corresponds to a respective plurality of users; and
   applying the identified Bloom filter to results in the list of results to identify the one or more first results, if any, in the list of results that the user has previously accessed.

9. The method of claim 1, wherein applying the multi-user Bloom filter to results in the list of results includes:
   identifying a Bloom filter in a plurality of Bloom filters in accordance with the user; and
   filtering the list of results with the identified Bloom filter to identify the one or more first results, if any, in the list of results that the user has previously accessed.

10. A method performed on a server system having one or more processors and memory storing one or more programs for execution by the one or more processors to perform the method, comprising:
    in response to search requests from each of a plurality of users at respective clients, retrieving a list of results responsive to each of the search request, including a first list of results responsive to a first search request from a first user at a first client and a second list of results responsive to a second search request from a second user at a second client;
    filtering results in the first list of results and results in the second list of results with a shared Bloom filter to produce a first filtered result list, comprising at least a portion of the first list of results, and a second filtered result list, comprising at least a portion of the second list of results;
    sending the first filtered result list to the first client; and
    sending the second filtered result list to the second client.

11. The method of claim 10, wherein the filtering identifies first results, if any, in the first list of results that the first user has previously accessed and identifies second results, if any, in the second list of results that the second user has previously accessed.

12. The method of claim 11 further including attaching information to the identified first and second results to indicate the respective user has previously accessed the identified first and second results.

13. The method of claim 10, wherein filtering the results in the first list and the second list includes:
    identifying a single Bloom filter in a plurality of Bloom filters in accordance with the first user and second user; and
    applying results in the first list of results and results of the second list of results to the identified single Bloom filter to produce the first filtered result list and the second filtered result list.

14. A method performed on a server system having one or more processors and memory storing one or more programs for execution by the one or more processors to perform the method, comprising:
    receiving a plurality of requests from a plurality of clients, each request comprising a request for a respective item by a respective client of the plurality of clients;
    for each received request, sending the requested respective item to the respective client; and
    updating a Bloom filter associated with the plurality of clients to indicate each respective item sent to a respective client, including storing in an array a plurality of values for each of the retrieved items, wherein updating the Bloom filter includes hashing a value comprising a combination of a plurality of values, including an item identifier representing an item sent to a respective client and a user identifier representing the respective client.

15. The method of claim 14, including filtering a first request for a first item by a first user associated with one of the plurality of clients with the Bloom filter to determine if the first user has previously requested the first item.

16. The method of claim 14, wherein the items are multimedia files.

17. The method of claim 14, further comprising retrieving a list of items responsive to a search request from one of the plurality of clients and filtering the list of items with the Bloom filter to identify a previously retrieved item.

18. The method of claim 14, further comprising sending a filtered list of items, filtered by the Bloom filter, to a respective client of the plurality of clients.

19. The method of claim 18 wherein, the filtered list identifies a previously sent item by highlighting information identifying the previously sent item.

20. The method of claim 14, further comprising
    maintaining a set of records identifying items requested or items sent to respective clients of the plurality of clients;
    upon occurrence of a predefined event:
    replacing the Bloom filter with a new Bloom filter generated from a subset of the set of records.

21. A computer system comprising:
    memory;
    one or more processors; and
    one or more programs stored in the memory to be executed by the one or more processors, the one or more programs including:
      instructions for retrieving a list of results responsive to a search request from a user at a first client;
      instructions for concatenating a user identifier with a content identifier for each result in the list of results to produce a plurality of concatenated results;
      instructions for applying a multi-user Bloom filter to the concatenated results to identify one or more first results, if any, in the list of results that the user has previously accessed;
      instructions for generating a result list comprising at least a portion of the list of results, based at least in part on the identified one or more first results; and
      instructions for sending the result list to the first client.

22. A non-transitory computer-readable storage medium storing one or more programs for execution by one or more processors of a computer system, the one or more programs comprising:
    instructions for retrieving a list of results responsive to a search request from a user at a first client;
    instructions for concatenating a user identifier with a content identifier for each result in the list of results to produce a plurality of concatenated results;
    instructions for applying a multi-user Bloom filter to the concatenated results to identify one or more first results, if any, in the list of results that the user has previously accessed;
    instructions for generating a result list comprising at least a portion of the list of results, based at least in part on the identified one or more first results; and
    instructions for sending the result list to the first client.

23. The method of claim 1, further comprising:

concatenating the user identifier with the content identifier for each result in the list of results to produce a plurality of concatenated results; and applying the multi-user Bloom filter to the concatenated results to identify one or more first results, if any, in the list of results that the user has previously accessed.

\* \* \* \* \*